No. 607,277. Patented July 12, 1898.
F. S. ROOT.
SELF FOLDING PARCEL CARRIER.
(Application filed Feb. 10, 1898.)
(No Model.)
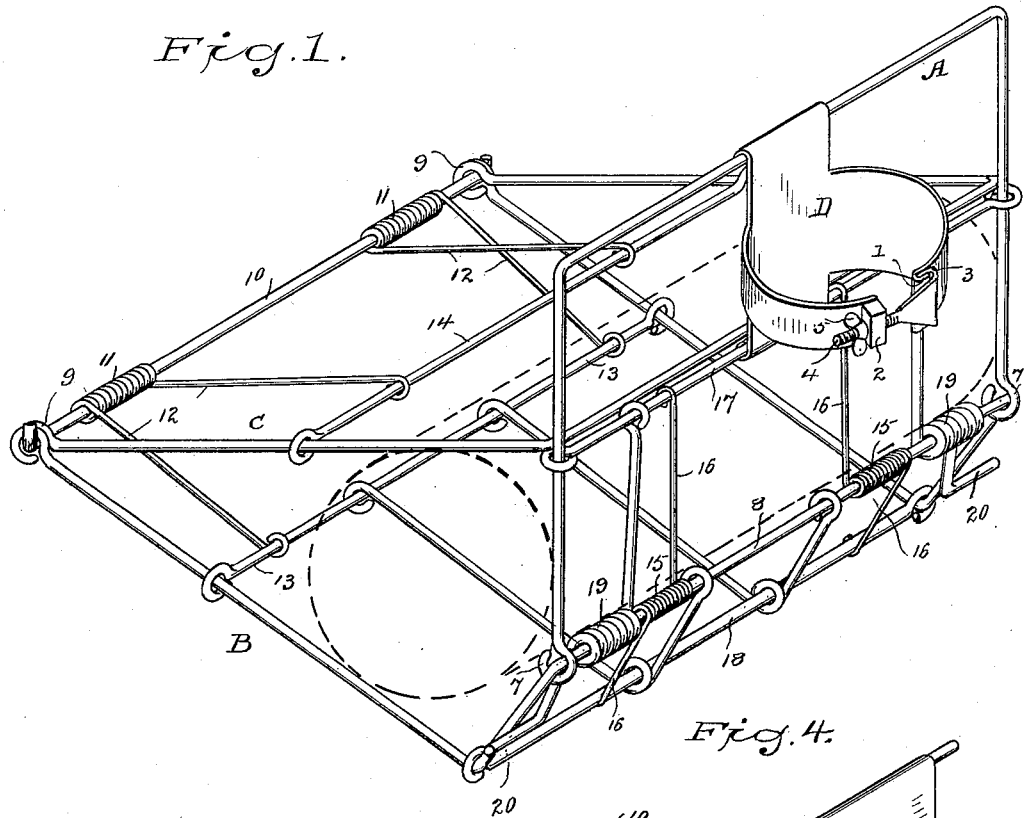
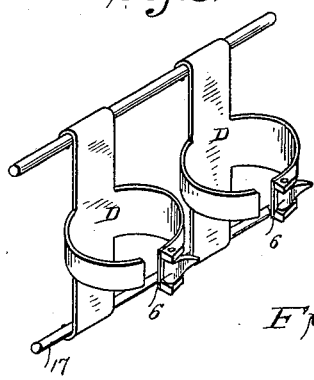
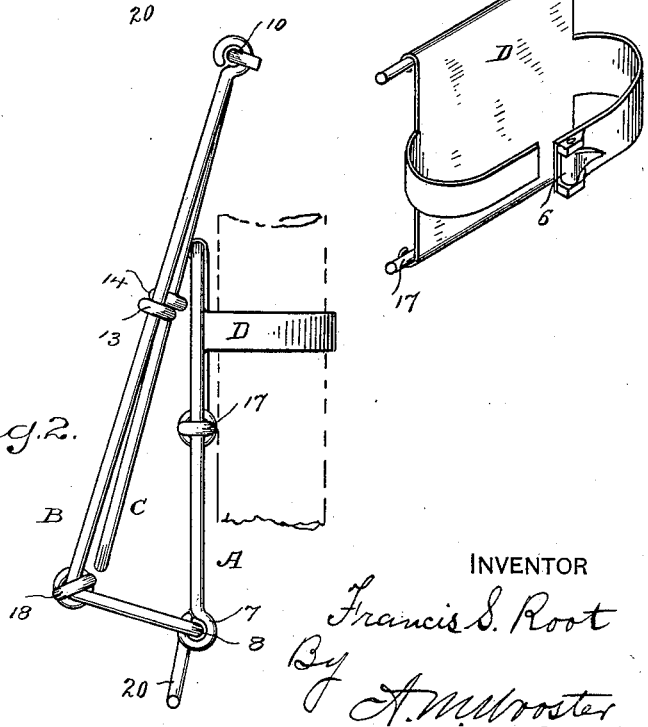
WITNESSES
H. A. Lamb
S. V. Foley
INVENTOR
Francis S. Root
By A. M. Wooster
Atty.

UNITED STATES PATENT OFFICE.

FRANCIS S. ROOT, OF SUFFIELD, CONNECTICUT.

SELF-FOLDING PARCEL-CARRIER.

SPECIFICATION forming part of Letters Patent No. 607,277, dated July 12, 1898.

Application filed February 10, 1898. Serial No. 669,733. (No model.)

*To all whom it may concern:*

Be it known that I, FRANCIS S. ROOT, a citizen of the United States, residing at West Suffield, county of Hartford, State of Connecticut, have invented a new and useful Self-Folding Parcel-Carrier, of which the following is a specification.

My invention has for its object to provide a parcel-carrier adapted for attachment either to the head or rear fork of a bicycle which shall be simple and inexpensive to produce, always ready for use, and which shall be self-folding and self-adjusting to parcels of varying size, straps, tapes, &c., being wholly dispensed with.

With these ends in view I have devised the novel construction of which the following description, in connection with the accompanying drawings, is a specification, letters and numbers being used to designate the several parts.

Figure 1 is a perspective of my novel parcel-carrier in operative position, a parcel being indicated by dotted lines; Fig. 2, an end view showing the carrier in the folded position, and Figs. 3 and 4 are perspectives illustrating clamps for attaching the carrier to the rear fork of a bicycle.

My novel carrier comprises three essential elements or members—to wit, a back piece or member A, which is provided with means for attachment to a bicycle, a carrying piece or member B, upon which the parcel or parcels to be carried rest, and a retaining piece or member C, by which the parcel or parcels are held in place upon member B. These members are preferably made of wire, although sheet metal may be used, if preferred. It should be understood that the design of the members, the number of pieces of wire used in each member, and the mode in which the members are connected together are not of the essence of my invention and may be varied to an almost unlimited extent without departing from the spirit of my invention.

Member A is provided with a clamp D, by which the carrier is attached to either the head, handle-bar rod, or rear fork of a bicycle. The special form of clamp used is not of the essence of my invention. In Fig. 1 I have shown a clamp made of sheet metal and adapted to engage the head or handle-bar rod of a bicycle. In this view I have shown one arm of the clamp as provided with a hook 1 and the other arm as provided with a block 2. A hook 3 is adapted to engage hook 1 and is provided with a threaded shank 4, which passes through the block and is engaged by a wing-nut 5 to tighten the clamp about the part of the bicycle to which the carrier is attached. In Fig. 4 I have illustrated a form of clamp made wider and flattened to adapt it to engage the rear fork of a bicycle, and in Fig. 3 I have shown two smaller clamps adapted to engage the rear fork of a bicycle. In Figs. 3 and 4 one arm of the clamp is shown as carrying a cam-lever 6. The other arm of the clamp is adapted to pass under the cam-lever and to be locked in position by movement of the cam.

Member B—*i. e.*, the carrying-piece—is shown as made L-shaped and as pivoted at the lower end of member A. In the present instance I have shown member A as provided with eyes 7, in which a rod 8, which forms a part of member B, turns freely. It should be understood, however, that I do not limit myself to special details of construction. It is simply necessary that these parts be pivotally connected together, but wholly immaterial how they are pivoted.

Member C is pivotally connected to the outer edge of member B. In the present instance eyes 9 upon member C turn upon a rod 10 in member B. The parts may be transposed, however, if preferred—that is to say, the eyes may be formed upon member B and the rod constitute a part of member C, or eyes may be formed upon both parts, it being wholly immaterial, as stated above, how the parts are connected together.

11 denotes springs the action of which is to fold member C down upon any parcel or parcels carried by member B or to fold member C down upon member B, as in Fig. 2, when the carrier is not in use. The shape of these springs is not of the essence of my invention. I have shown the springs as coiled about rod 10 and as provided with arms 12, which engage cross-pieces 13 and 14 in members B and C, respectively.

15 denotes springs the action of which is to hold member B, and with it member C, in the folded position, as in Fig. 2, and also to assist in holding a parcel or parcels when the device is in use, as in Fig. 1, the action of springs 15 being to lift member B toward the folded position, and consequently, in connection with member C, to press the parcel or parcels thereon inward toward member A, as is clearly indicated in Fig. 1. I have shown springs 15 as coiled about rod 8 and as provided with arms 16, which engage cross-pieces 17 and 18 in members A and B, respectively. In addition to springs 15 I provide strong stop-springs 19, which act supplementally to springs 15 to support member B when a weight is placed thereon. These stop-springs are shown as coiled about rod 8 in the same manner as springs 15 and as provided with arms which engage cross-piece 17 on member A. The other arms of said springs, which I have indicated by 20, are made L-shaped and are so placed as to engage the L-shaped portion of member B when the latter is pressed down by the weight of a parcel, as in Fig. 1. Arms 20, however, are not attached to member B and remain at their normal position when members B and C are thrown to the folded position, as in Fig. 2.

It should be understood that I do not confine myself to any special details as to the size, strength, and arrangement of any of the springs; but they may be varied to suit the requirements of the trade or the taste of the manufacturer.

Having thus described my invention, I claim—

1. A self-folding parcel-carrier comprising a member A provided with means for attachment, a member B pivotally secured to member A, a member C pivotally secured to member B and springs acting to fold member C upon member B and to fold members B and C upon member A and when in use to clamp a parcel between said members.

2. A self-folding parcel-carrier comprising a member A provided with means for attachment, a member B pivotally secured thereto, a member C pivotally secured to member B, springs acting to fold member C upon member B and member B upon member A, and stop-springs having arms which are engaged by member B when carrying a weight.

3. In a device of the character described the combination with member A having a clamp comprising an arm having a hook 1, an arm carrying a block and a hook 3 adapted to engage hook 1 and having a threaded shank passing through the block and a wing-nut by which the clamp is locked, of member B pivotally secured to member A, member C pivotally secured to the outer edge of member B and springs acting to fold member C upon member B and member B upon member A so that a parcel placed upon member C will be held by said members without straps.

4. The combination with member A having a clamp D, of an L-shaped member B pivotally secured to member A, a member C pivotally secured to the outer edge of member A and springs for holding a parcel without straps and for folding members C and B upon member A when not in use.

In testimony whereof I affix my signature in presence of two witnesses.

FRANCIS S. ROOT.

Witnesses:
J. O. HASKINS,
GEO. F. HARMON.